United States Patent [19]

Berner

[11] Patent Number: 4,626,144
[45] Date of Patent: Dec. 2, 1986

[54] BORING TOOL WITH BALANCING MEANS FOR NON-VIBRATING BORING

[75] Inventor: Willy Berner, Rupperswil, Switzerland

[73] Assignee: Urma Aktiengesellschaft, Rupperswil, Switzerland

[21] Appl. No.: 708,950

[22] Filed: Mar. 6, 1985

[30] Foreign Application Priority Data

Mar. 21, 1984 [CH] Switzerland .................. 1434/84

[51] Int. Cl.⁴ ............................................ B23B 47/00
[52] U.S. Cl. .................................. 408/143; 409/141; 82/DIG. 9; 74/573 R
[58] Field of Search ............... 408/147, 150, 151, 153, 408/143, 16, 116, 181; 409/141; 82/DIG. 9; 464/180; 74/573 R

[56] References Cited

U.S. PATENT DOCUMENTS

| | | |
|---|---|---|
| 1,645,343 | 10/1927 | Moorhouse ...................... 74/573 R |
| 2,241,637 | 5/1941 | Ernst et al. ........................ 74/573 R |
| 2,426,400 | 8/1947 | Lampton et al. .................. 74/573 R |
| 3,000,240 | 9/1961 | Eckardt ............................... 408/151 |
| 3,044,323 | 7/1962 | Sweeny .............................. 408/185 |
| 3,528,316 | 9/1970 | Hammer ............................. 464/180 |
| 4,070,922 | 1/1978 | Wyman ............................... 464/180 |

Primary Examiner—Z. R. Bilinsky
Assistant Examiner—A. Dougas
Attorney, Agent, or Firm—Walter C. Farley

[57] ABSTRACT

A boring tool with interchangeable tool bit holders is equipped with weight balancing members pivotable about a common fulcrum located on the rotation axis of the fine boring head. The weight balancing members are in the form of circular segments. They are pivoted from their given position about the common fulcrum by means of pull cords fixed thereto. In principle, each pull cord is fixed to each weight balancing member. Thus, a first pull cord fixed to one side of two weight balancing members is guided about a first guide bolt and a second pull cord fixed to the other side of the two weight balancing members is guided about a second guide bolt.

6 Claims, 5 Drawing Figures

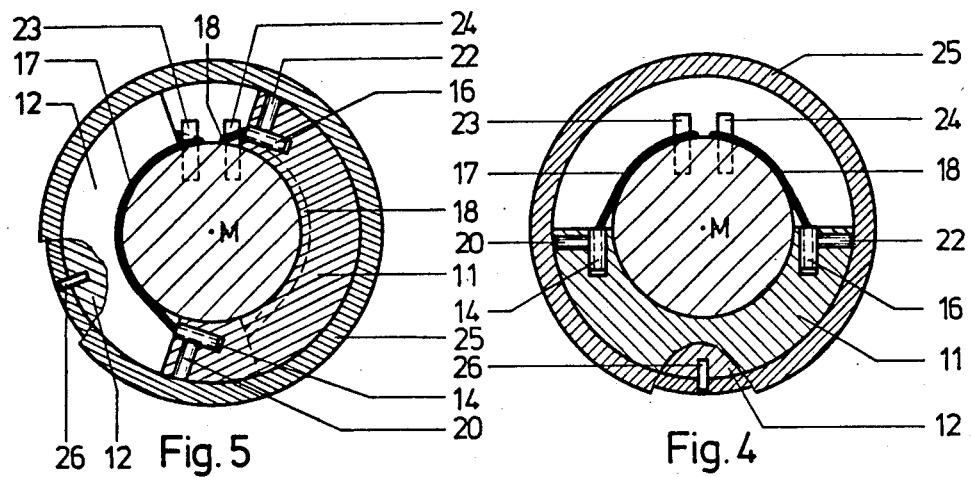
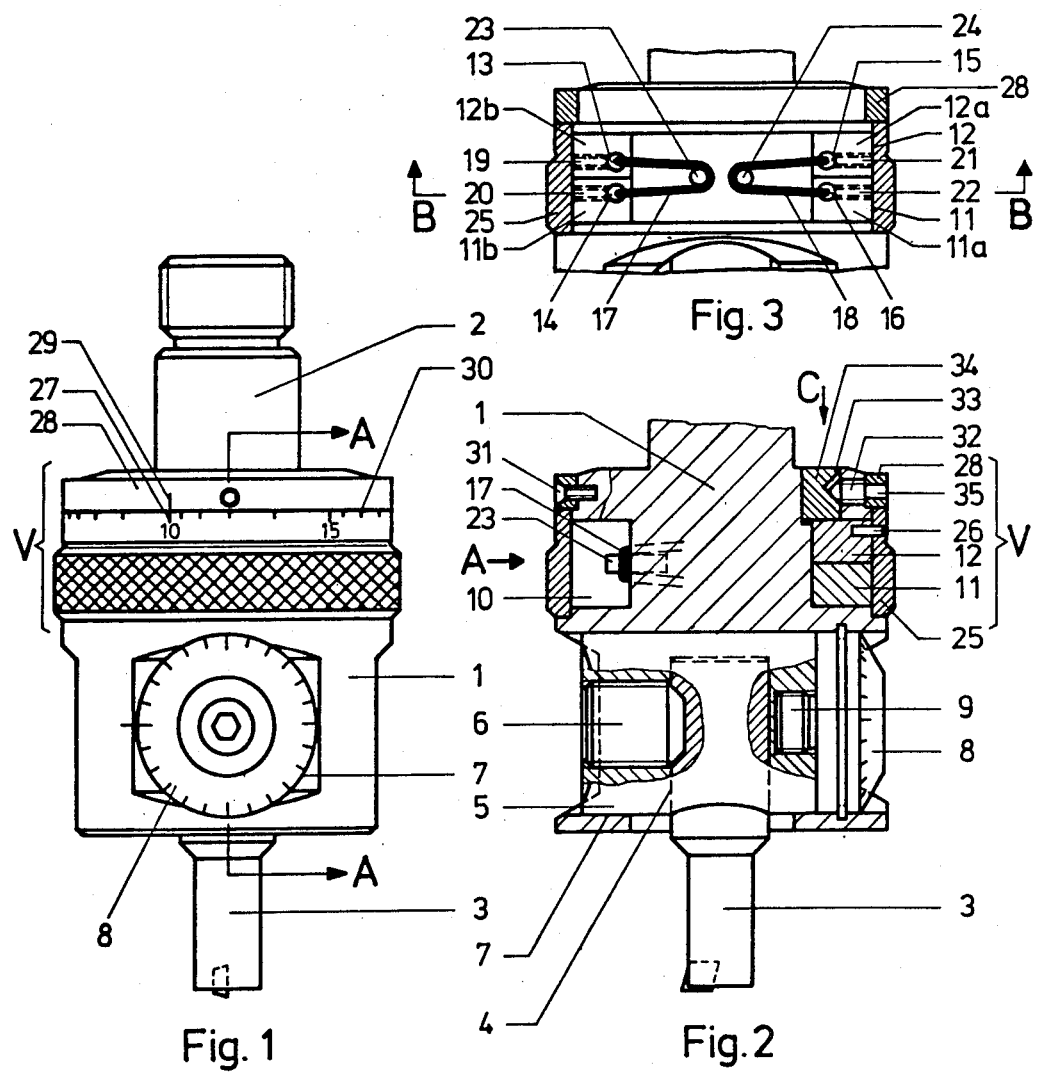

BORING TOOL WITH BALANCING MEANS FOR NON-VIBRATING BORING

The invention is in the field of cutting tools for machine tools and relates to a mechanism on a boring tool with interchangeable tool bit holders.

For the precision finishing and microfinishing of bores with rotary tools, fine boring heads are known, which can be universally set for machining different bore diameters. The mass is necessarily eccentrically displaced. This leads to an unbalance in the fine boring head which produces vibrations preventing precise bores with high surface quality from being obtained. Modern cutting materials permit a high cutting speed, so that rotary boring tools with correspondingly high speeds can be used. The higher the speeds, the more negative the influence of the unbalance and consequently the effect of the vibrations on the bore quality.

SUMMARY OF THE INVENTION

According to the invention, through providing a mechanism on the fine boring head, the unbalance occurring on the latter on setting the diameter of the bore to be machined can be compensated Briefly described the invention includes a boring tool having a boring head attachable to a machine, and means on the head for holding a cutting tool so that it can be adjusted radially relative to the axis of rotation of the head to define a selected cutting circle. Balancing means on the head, to offset the eccentric mass effect of the radially adjusted tool, includes first and second weights mounted for circular movement about the axis of rotation of the head. Cords interconnect the weights so that when one is moved circularly, the other also moves but in the opposite direction. An adjusting ring is mounted on the head and coupled to one weight so that movement of the ring moves both of the weights. Clamping means holds the weights in the position selected by ring rotation.

BRIEF DESCRIPTION OF THE DRAWINGS

The invention is described in greater detail hereinafter relative to non-limitative embodiments and the attached drawings, wherein:

FIG. 1 is a side view of the fine boring head for connection to a machine spindle or adaptor;

FIG. 2 is a section along line A—A of FIG. 1;

FIG. 3a a partial section from direction A of FIG. 2;

FIG. 4 is a section along line B—B of FIG. 3 with the circular segments superimposed; and FIG. 5 is a section along line B—B of FIG. 3 with diametrically facing circular segments.

DESCRIPTION OF THE PREFERRED EMBODIMENT

FIG. 1 is a view of a boring tool comprising a fine boring head 1, to whose one end is fitted a journal 2, which is used for receiving the tool in the machine spindle or in an adaptor. On the other end of the fine boring head, a replaceable cutting bit holder 3 is placed in the bore 4 of an adjusting member 5 and is secured with a screw 6. Adjusting member 5 is positioned in sliding manner in a cross bore 7 of fine boring head 1. A scale screw 8 with a threaded shaft 9, which fits into the internal thread in adjusting member 5, makes it possible to set the desired bore diameter by properly setting the radial displacement of the bit holder 4, the center of mass consequently also being moved away from or towards the rotation axis. Thus, in the case of an "adjusted" bit holder, the rotary movement no longer takes place about the centre of gravity of the mass system, so that vibrations can occur.

Above the scale screw 8, fine boring head 1 in FIG. 1 has an adjusting mechanism V for the mass balance in the mass system of the boring tool. Mechanism V is shown in greater detail in FIG. 2.

Two circular disk segment-shaped weight balancing members 11, 12, hereinafter called circular segments, are arranged in adjustable sliding manner in a recess 10 of fine boring head 1. A bore for receiving one of sleeves 13, 14, 15, 16 is made on each of the end faces 11a, 11b, 12a, 12b of these two circular segments (FIG. 3). Two equally long pull cords, strings or tapes 17 and 18, which can e.g. be made from synthetic fibrous material or metal, are drawn into said sleeve, in the same was as laces. Set screws 19, 20, 21, 22 fix the pull cords or strings 17, 18, provided with sleeves at their ends, to the circular segments 11, 12, in such a way that each pull cord engages on both segments. This means that the pull cord 17 is fixed to one front face 11b, 12b of circular segments 11 and 12 respectively and the other pull cord 18 to the other end faces 11a, 12b thereof. Thus, the circular segments can be pivoted in opposite directions relative to one another, so as to slide about a common rotation point or fulcrum M. For this purpose, guide bolts 23, 24 are provided (FIGS. 3 and 4), one pull cord 17 being guided about bolt 23 and the other pull cord 18 about bolt 24. Finally, one of the two circular segments, in the present embodiment circular segment 12, is connected by a coupling pin 26 to an adjusting ring 25.

When adjusting ring 25, is turned circular segment 12 is rotated through the same rotational angle as the ring, but circular segment 11 is rotated by the same distance in the opposite direction. FIGS. 4 and 5 show the circular segment adjustment possibilities in the two extreme positions. In FIG. 4, the two segments 11, 12 are substantially superimposed, i.e. the mass point is displaced to the maximum from the rotation centre and thus, from the standpoint of the setting possibilities, gives the maximum eccentric balance weight for compensating the radially adjusted bit holder. In FIG. 5, the two segments 11, 12 substantially face one another (considered from the mass point standpoint), i.e. they reciprocally "neutralize" one another and are consequently in an unbalance-neutral position.

A mathematical or empirical procedure is used for positioning the reference marks relevant for the particular setting around the adjusting ring 25. The empirical procedure has proved best, in that with the bit holder fixed for different boring diameters, the optimum position of the adjustable masses, i.e. circular segments 11 and 12 is established on a balancing device. The corresponding position of adjusting ring 25 to a reference mark on a holding ring 28 is marked. Thus, each successive boring diameter is dealt with, so as to finally obtain a completed scale 30 on adjusting ring 25. The scale marks can be looked upon as fixed setting values and if they are not too far apart, it is optionally possible to interpolate a boring diameter between the graduation marks.

In this embodiment, the holding ring 28 is bolted or screwed down with fastening screws 31 onto the periphery of the fine boring head 1 (FIG. 2). A sharp stud bolt 32 in the fine boring head 1 engages a wall of the vertically offset countersunk recess 33 of the clamping bolt 34 movably arranged in the bore. For fixing the set mass position, a pin-type (allen) wrench can be placed on stud bolt 32 through a bore 35 in holding ring 28. By tightening this stud bolt, the binding bolt 34 moves in direction C (FIG. 1) and clamps the circular segments 11, 12 in the set working position.

The dynamic mass balance is brought about in the disclosed embodiment by the position and weight of circular segments 11 and 12, a relatively minor role being played by the shape of the weights. The circular segment shape was chosen for structural reasons so that, apart from manufacturing advantages, an adequate balance mass would be provided in the fine boring head 1. However, in principle, other shapes are conceivable. With respect to its specific gravity, steel has proved adequate as the mass material. However, if necessary, other materials with a higher specific gravity can be chosen for producing the balancing members or for filling the bores in the balancing members. Since with an identical oppositely directed displacement of the circular segmental balancing members according to the invention, they must be of the same weight, it is recommended that the weights of the two members be matched to one another in known manner by drilling away extra weight.

The mechanism according to the invention is equipped on a boring tool with interchangeable tool bit holders with weight balancing members 11, 12 pivotable about a common fulcrum M located on the rotation axis of the fine boring head. In the discussed embodiment, the weight balancing members 11, 12 are in the form of circular segments. They are pivoted out of their given position about the common fulcrum M by means of pull cords 17, 18 fixed thereto. In principle, each pull cord 17, 18 is fixed to each weight balancing member 11, 12. Thus, in the represented embodiment, a first pull cord 18 fixed to one side 11a, 12a of two weight balancing members 11, 12 is guided about a first guide bolt 24 and a second pull cord 17 fixed to the other side 11b, 12b of the two weight balancing members 11, 12 is guided about a second guide bolt 23. An adjusting ring 25 is fixed to one of the weight balancing members 12 and a holding ring 28 corresponding to adjusting ring 25 is fixed to the bodies of the fine boring head 1. Adjusting ring 25 carries a scale 30, which is dependent on the reciprocal positioning of the balancing members.

I claim:
1. A boring tool comprising:
   a boring head having an axis of rotation and means for attachment of said head to a rotatable member of a machine tool;
   means on said head for adjustably holding a cutting tool so that the cutting edge thereof can be radially adjusted relative to said axis of rotation to define a selected cutting circle;
   balancing means on said head for establishing an eccentric mass to balance the unbalancing effect of eccentric positioning of said cutting tool, said balancing means including
      first and second movable weight segments mounted for circular movement about said axis of rotation,
      elongated, flexible cord means for interconnecting said weights so that movement of said first weight in one direction causes movement of said second weight in the other direction,
      an adjusting ring rotatably mounted on said head and coupled to said first weight so that manual rotation of said ring moves both of said weights, and
      clamping means on said head for clamping said weights in any position selected by rotation of said adjusting ring.

2. A boring tool according to claim 1 and further comprising
   indicia on said head and said adjusting ring to indicate the degree of eccentric mass provided by said weights at various positions of said ring.

3. A boring tool according to claim 2 wherein each of said first and second weights is in the shape of a segment of a ring.

4. A boring tool according to claim 3 wherein said cord means includes first and second flexible cords each interconnecting both of said first and second weights.

5. A boring tool according to claim 4 and further including first and second guide pins attached to said head, and wherein
   said first cord is connected to a first end of said first weight, passes around said first guide pin and is connected to a first end of said second weight,
   and wherein said second cord is connected to the other end of said first weight, passes around said second guide pin and is connected to the other end of said second weight.

6. A boring tool according to claim 5 wherein said head includes an annular recess for receiving said first and second weights, and wherein
   said clamping means includes a clamping body at one axial side of said recess, and
   screw means for urging said clamping body toward weights to clamp said weights between said body and the other axial side of said recess.

* * * * *